(12) United States Patent
Soliman et al.

(10) Patent No.: US 10,764,822 B2
(45) Date of Patent: Sep. 1, 2020

(54) SYSTEMS, METHODS AND DEVICES FOR SELECTING A PUBLIC LAND MOBILE NETWORK USING COVERAGE ENHANCEMENT INDICATORS

(71) Applicant: APPLE INC., Cupertino, CA (US)

(72) Inventors: Ahmed Soliman, Nuremberg (DE); Robert Zaus, Munich (DE); Amr Mostafa, Munich (DE); Anuj Sethi, Nuremberg (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/489,178

(22) PCT Filed: May 25, 2018

(86) PCT No.: PCT/US2018/034644
§ 371 (c)(1),
(2) Date: Aug. 27, 2019

(87) PCT Pub. No.: WO2018/218145
PCT Pub. Date: Nov. 29, 2018

(65) Prior Publication Data
US 2019/0394719 A1    Dec. 26, 2019

Related U.S. Application Data

(60) Provisional application No. 62/511,796, filed on May 26, 2017.

(51) Int. Cl.
*H04W 48/10* (2009.01)
*H04W 48/18* (2009.01)
*H04W 48/16* (2009.01)

(52) U.S. Cl.
CPC .......... *H04W 48/18* (2013.01); *H04W 48/10* (2013.01); *H04W 48/16* (2013.01)

(58) Field of Classification Search
CPC ..... H04W 48/18; H04W 16/14; H04W 28/08; H04W 36/22; H04W 48/10
See application file for complete search history.

(56) References Cited

U.S. PATENT DOCUMENTS

2012/0322412 A1* 12/2012 Qiang ................ H04W 48/16
455/411
2016/0219503 A1   7/2016 Kim et al.

FOREIGN PATENT DOCUMENTS

| EP | 2981134 A1 | 2/2016 |
| EP | 3131346 A1 | 2/2017 |
| WO | 2015117714 A1 | 8/2015 |

OTHER PUBLICATIONS

Intel Corporation, "New S-criteria for enhanced coverage in idle mode", R2-1702330, 3GPP TSG-RAN WG2 Meeting #97, Athens, Greece, Change Request 36.301 Current Version 14.1.0, Feb. 13-17, 2017, 6 pages.

(Continued)

*Primary Examiner* — Sam Bhattacharya
(74) *Attorney, Agent, or Firm* — Stoel Rives LLP

(57) ABSTRACT

A user equipment (UE) explicitly accounts for a coverage enhancement (CE or sometimes called enhanced coverage) feature in a public land mobile network (PLMN) search and/or selection. By explicitly using CE indicators in PLMN search and/or selection, a UE can determine whether to use a PLMN that may only be available in CE mode for voice services or data services, or fail to meet criteria, such as high data rate, that cannot be provided in CE mode. For example a UE can use the PLMN search and/or selection with (1) automatic PLMN selection at switch-on or recovery from lack of coverage, (2) higher priority PLMN selection, (3) manual PLMN selection, and/or (4) limited service capabilities while in CE mode.

22 Claims, 7 Drawing Sheets

(56) References Cited

OTHER PUBLICATIONS

PCT/US2018/034644, International Search Report and Written Opinion, dated Jul. 16, 2018, 19 pages.

* cited by examiner

SYSTEMS, METHODS AND DEVICES FOR SELECTING A PUBLIC LAND MOBILE NETWORK USING COVERAGE ENHANCEMENT INDICATORS

RELATED APPLICATION

This application claims the benefit under 35 U.S.C. § 119(e) of U.S. Provisional Application No. 62/511,796 filed May 26, 2017, which is hereby incorporated by reference herein in its entirety.

TECHNICAL FIELD

The present disclosure relates to cellular communications and more specifically to selecting a public land mobile network (PLMN) with coverage enhancement (CE).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
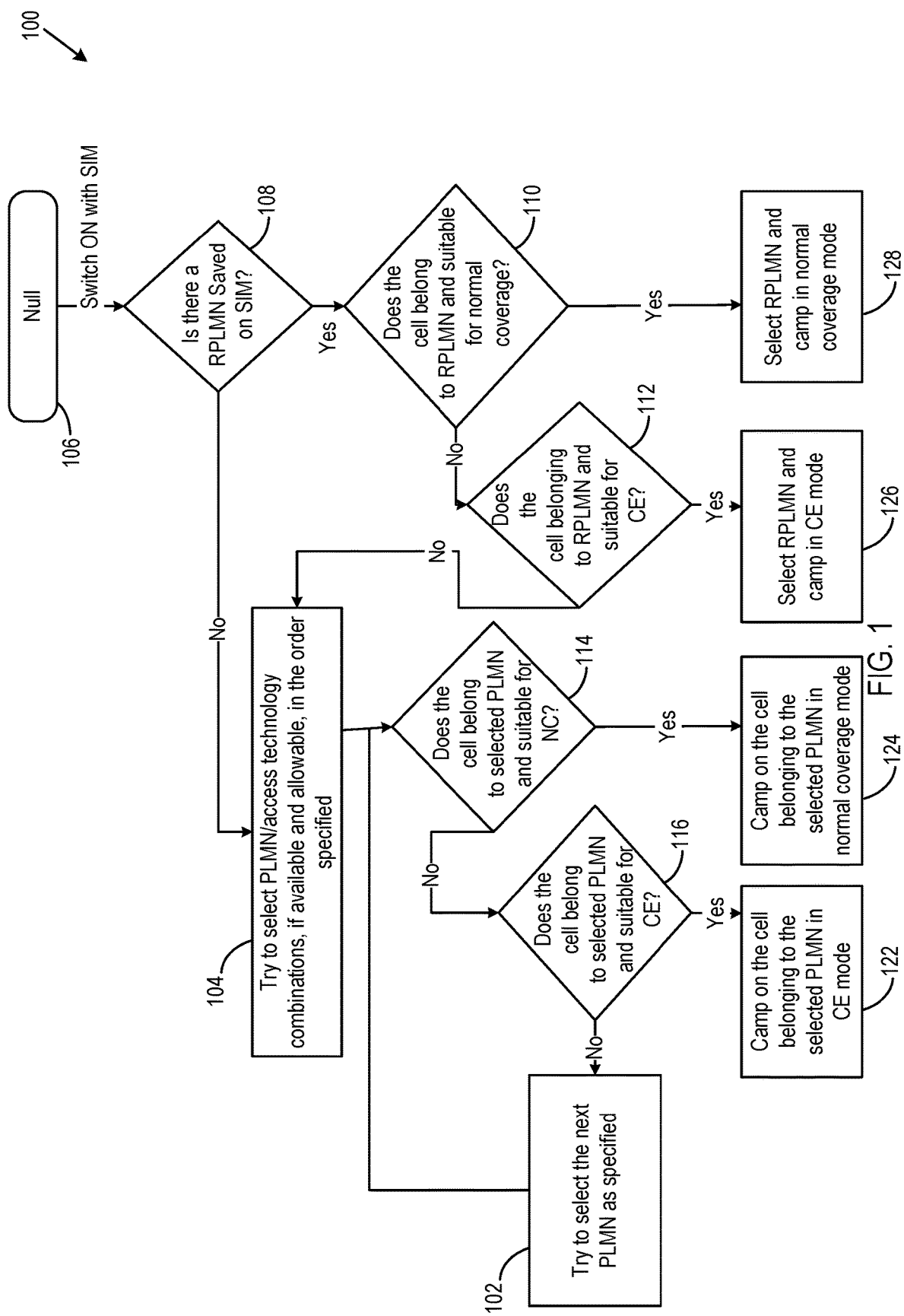
FIG. 1 is a diagram illustrating a method of PLMN searching accounting for CE consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a user equipment (UE) to explicitly account for a coverage enhancement (CE or sometimes called enhanced coverage) feature in a public land mobile network (PLMN) search and/or selection. By explicitly using CE indicators in PLMN search and/or selection, a UE can determine whether to use a PLMN that may only be available in CE mode for voice services or data services, or fail to meet criteria, such as high data rate, that cannot be provided in CE mode. For example a UE can use the PLMN search and/or selection with (1) automatic PLMN selection at switch-on or recovery from lack of coverage, (2) higher priority PLMN selection, (3) manual PLMN selection, and/or (4) recovery from limited service capabilities while in CE mode.

For example, in some embodiments, a PLMN is selected based on normal coverage, and if normal coverage cannot be satisfied, then a PLMN with CE can be selected. In other embodiments, the UE ignores higher priority PLMNs from an equivalent to home PLMN (EHPLMN) list if the higher priority PLMNs are available only in CE (e.g., do not support normal coverage) and a lower priority PLMN from the EHPLMN list is available in normal coverage. In some embodiments, priority can be determined from lists such as an Operator controlled PLMN Selector with Access Technology, a User Controlled PLMN Selector with Access Technology, or a combination of these lists.

Coverage enhancement (CE) is a feature which allows the UE camping on E-UTRAN to camp on the cell even in bad coverage use cases instead of going out of coverage. CE is defined for bandwidth reduced low complexity (BL) UEs and higher category UEs (Non-BL UEs).

For example, a UE can decode system information broadcast by base stations from a set of PLMNs detected and/or found during the PLMN search. This system information can be decoded from master information blocks (MIBs) and system information blocks (SIBs) broadcast from base stations (such as eNBs, gNBs).

CE can impact the different PLMN search/selection procedures, as a CE only PLMN may have a higher priority. An absence of explicit consideration of CE may lead to an undesirable UE behavior which can affect both the UE and the network. In CE mode certain services (e.g., voice calls, or data services with high bit rate and/or low latency) may not be available. Some examples of the expected issues include: (1) automatic PLMN selection at switch-on or recovery from lack of coverage, (2) higher priority PLMN selection, (3) manual PLMN selection, and/or (4) recovery from limited service capabilities while in CE mode.

Issue 1—Automatic PLMN Selection at Switch-on or Recovery from Lack of Coverage

The order of priority in which PLMNs are to be selected at switch-on or recovery from lack of coverage can be defined, but it is not clear if a UE shall consider the CE at this PLMN selection process or not, i.e., whether the UE is allowed to select a cell on which it can only camp in enhanced coverage mode.

For example at switch-on, a Non-BL UE may find a cell belonging to the home PLMN (HPLMN) or registered PLMN (RPLMN), but the signal quality of this cell is very low (it is expected that this cell may fulfill only the CE S criteria for a "suitable cell" in enhanced coverage mode and may not fulfil the S criteria for a "suitable cell" in normal coverage mode). Shall the UE select this PLMN? Or shall the UE ignore it and try to select another PLMN which has a lower priority, e.g., a PLMN from the user controlled PLMN list, if the UE can find a cell of this PLMN which fulfils the S criteria for a "suitable cell" in normal coverage mode?

If the UE always has to select the PLMN of highest priority (according to an order of priority), regardless of the coverage mode in which the PLMN is available, the UE may end up on a cell in enhanced coverage mode and may not be able to get a kind of service the user wants to use (e.g., voice call).

Issue 2—Higher Priority PLMN Selection

It is not clear if a UE shall consider CE while performing the periodic search for higher priority PLMNs or not. For example, consider a Non-BL UE camping on a cell belonging to PLMN X. This UE performs a search for a higher priority PLMN. The UE finds a higher priority PLMN Y, but the signal quality of the cells belonging to this higher priority PLMN Y is very low (it is expected that these cells may fulfill the CE S criteria only and may not fulfill normal coverage S criteria). Shall the UE select this higher priority PLMN or ignore the PLMN?

If the UE always has to select the PLMN of higher priority, regardless of the coverage mode in which that PLMN is available, the UE may need to change from a cell on which it can camp in normal coverage mode to a cell of the higher priority PLMN on which it can camp only in enhanced coverage mode. On the new cell it may not be able to get the kind of service the user wants to use (e.g., voice call).

Issue 3—Manual PLMN Selection

It is not clear if the UE shall consider CE while performing manual PLMN selection or not. For example, if a user triggers manual PLMN selection for a Non-BL UE supporting CE, and some of the available PLMNs are received with a low quality signal only (i.e., they will be available only for CE mode), shall these PLMNs be considered for manual PLMN selection and indicated to the user as possible candidates for selection or shall they be ignored? Shall the UE support the user's choice by indicating whether a PLMN is available only for CE mode?

If available PLMNs are indicated regardless of the coverage mode in which they are available, and without indicating whether they are available for CE mode only, the user may select a PLMN on which the UE can camp only in enhanced coverage mode and may not be able to get the kind of service the user wants to use.

Issue 4—Coverage Enhancement and Limited Service Capabilities

A UE in CE mode can be limited in the available services (especially in CE mode B), because in coverage enhancement mode the UE and the network will use physical channels, channel coding and protocols that provide better error resilience via repetitions and other redundancy mechanisms (at the cost of throughput and transfer delay). Therefore, for example, if the UE requires high data rate services, the UE should not stay in coverage enhancement mode for a long time. Instead, the UE should go to CE mode for short periods as a temporary solution to avoid going out-of-coverage.

For example, there are two Non-BL UEs, UE_I which supports CE, and UE_II which does not support CE. Both UEs are located in the same place, camping on a cell belonging to PLMN X, and both are facing bad coverage conditions for a longer time period while high quality cells belonging to another PLMN (PLMN Y) are available. PLMN Y is not a higher priority PLMN, i.e., if UE_I and UE_II find PLMN Y during a periodic search for higher priority PLMNs, they will not select PLMN Y because it does not have a higher priority than PLMN X.

The UEs can then behave as follows. If UE_I camps on a cell belonging to PLMN X, and UE_I faces a coverage issue, UE_I will switch to CE mode and stay camped on the same cell or any other cell belonging to the same PLMN. If UE_I does not find any cell belonging to PLMN X providing good (i.e., normal) coverage, UE_I will stay in CE mode for a long time. During this time the user will not be able to use any high data rate services or voice calls.

As UE_I is camping on a cell belonging to PLMN X (although in CE mode), i.e., the UE_I does not lose coverage of its registered PLMN (RPLMN), UE_I does not try to select another PLMN, e.g., PLMN Y.

In contrast, UE_II which does not support CE behaves as follows. If UE_II camps on a cell belonging to PLMN X, and UE_II faces a coverage issue, UE_II will try to find a better cell belonging to PLMN X. UE_II does not find any cell belonging to PLMN X providing good coverage within a certain time. UE_II enters an out-of-service scenario and starts the PLMN selection procedure ("recovery from lack of coverage"). UE_II finds a suitable cell belonging to PLMN Y, selects PLMN Y and camps on the cell. The user is able to use high data rate services and voice calls.

In this example, the use of CE may prevent the UE from selecting a new PLMN providing normal coverage and offering the full set of services. A procedure which allows the UE to select a new PLMN if the UE faced a bad coverage condition in the current PLMN for a long time and voice services or data services which require a high data rate that cannot be provided in CE mode can improve the PLMN search of UE_I. This can allow the UE to leave CE.

The current PLMN search/selection procedures can be enhanced so that the CE feature is taken into account explicitly. This section provides multiple solutions for each issue which was described above.

Solution 1—Automatic PLMN Selection at Switch-on or Recovery from Lack of Coverage This solution can address the issue 1—automatic PLMN selection at switch-on or recovery from lack of coverage. The following options are examples of possible solutions for Issue 1, described as options (i.e., embodiments).

Option 1: CE shall be considered in PLMN selection. For example, a PLMN is considered available for PLMN selection, regardless of whether a cell belonging to this PLMN fulfils the "suitable cell" criteria for normal coverage or for enhanced coverage only. So in the example in issue 1, UE shall select the RPLMN or HPLMN, respectively.

Option 2: CE shall not be considered in PLMN selection. For example, a PLMN is considered available for PLMN selection only if at least one cell belonging to this PLMN fulfils the "suitable cell" criteria for normal coverage. So in the scenario in issue 1, the UE shall not select RPLMN or HPLMN, but shall try to select a PLMN which has a lower priority, e.g., a PLMN from the user controlled PLMN list.

Option 3: CE shall be partially considered. For example, the UE may ignore a higher priority PLMN X from the EHPLMN list if this PLMN can be selected only with CE camping and there is another PLMN Y in the EHPLMN list on which the UE can camp with normal coverage. But if there is no other PLMN from the EHPLMN list available with normal coverage conditions, then the UE shall select the PLMN X from the EHPLMN list with CE access instead of selecting a lower priority PLMN, e.g., from the user controlled PLMN list.

Option 4: do a first round of PLMN selection without considering CE (i.e., as in option 2 above), and if no PLMN is found, then repeat the PLMN selection process with considering CE (as in option 1).

Option 5: give the user the ability to select the preferred option, so the user can request to consider CE in PLMN selection according to one of the options 1, 2, 3 or 4.

Option 6: give the operator the ability to configure the preferred option, 1, 2, 3, 4, or 5, e.g., on the USIM or in an Open Mobile Alliance (OMA) Managed Object (MO). If the operator configures option 5, the operator may restrict the set of options from which the user can choose to a subset of {1, 2, 3, 4}.

Solution 2—Higher Priority PLMN Selection

This solution can address the issue 2—higher priority PLMN selection. The following options are examples of possible solutions for issue 2, described as options (i.e., embodiments).

Option 1: CE shall be considered in higher priority PLMN selection. For example, a higher priority PLMN is considered available for higher priority PLMN selection, regardless of whether a cell belonging to this PLMN fulfils the "suitable cell" criteria for normal coverage or for enhanced coverage only. So in the example in issue 2, UE shall select the higher priority PLMN Y.

Option 2: CE shall not be considered in higher priority PLMN selection. For example, a higher priority PLMN is considered available for PLMN selection only if at least one cell belonging to this PLMN fulfils the "suitable cell" criteria for normal coverage. So in the example in issue 2, the UE shall not select the higher priority PLMN Y.

Options 3: CE shall be partially considered in higher priority PLMN selection. For example, a higher priority PLMN is considered available for PLMN selection only if at least one cell belonging to this higher priority PLMN fulfils the "suitable cell" criteria for the same or "better" coverage conditions than the current cell. So in the scenario in the issue 2, the UE shall select the higher priority PLMN Y on which it will be able to camp in enhanced coverage conditions only if the UE is already camping with CE mode on the cell belonging to the current PLMN.

Option 4: Trigger first round of search without CE (i.e., as in option 2 above) and if nothing is found, then repeat the higher priority PLMN selection process and considering CE (as in option 1).

Option 5: give the user the ability to select the preferred option, so the user can request to consider CE in high priority PLMN selection according to one of the options 1, 2, 3 or 4.

Option 6: give the operator the ability to configure the preferred option, 1, 2, 3, 4, or 5, e.g., on the USIM or in an OMA MO. If the operator configures option 5, the operator may restrict the set of options from which the user can choose to a subset of options {1, 2, 3, 4}.

Solution 3—Manual PLMN Selection

This solution can address the issue 3—manual PLMN selection. The following options are examples of possible solutions for issue 3, described as options (i.e., embodiments).

Option 1: CE shall be considered and indicated to the user in manual PLMN selection. For example, a PLMN is considered available for manual PLMN selection, regardless of whether a cell belonging to this PLMN fulfils the "suitable cell" criteria for normal coverage or for enhanced coverage only. Additionally, the user is provided with an indication of which of the PLMNs fulfils the "suitable cell" criteria for enhanced coverage only. So in the example in issue 3, a UE shall provide a list of the PLMNs including the PLMNs received with a low quality signal, and the UE shall indicate to the user if PLMN is available for CE camping only.

Option 2: CE shall not be considered in manual PLMN selection. For example, a PLMN is considered available for PLMN selection only if at least one cell belonging to this PLMN fulfils the "suitable cell" criteria for normal coverage. So in the scenario in issue 3, the UE shall provide a list of the PLMNs excluding the PLMNs received with low quality (which are available for CE camping only).

Options 3 and 4 do not have a corresponding example in solution 3.

Option 5: give the user the ability to select the preferred option, so the user can request to consider CE in manual PLMN selection according to option 1 or 2.

Option 6: give the operator the ability to configure the preferred option, 1, 2, or 5, such as on the USIM or in an OMA MO.

Option 7: search while presenting options to the user. For example, for manual PLMN selection the UE performs a search on supported radio access technologies, and once the search is completed the UE provides a list of available PLMNs to the user in which the PLMNs are ordered according to their priorities. The user can then select any PLMN from this list. "Progressive manual PLMN search" is a variant of this procedure in which, while the search is still ongoing, the UE provides the list of the available PLMNs that have been found so far and inserts new PLMNs when they are found. The user can at any time select any PLMN from this list. This will stop (interrupt) the search process and trigger a registration attempt. CE can be considered for this progressive manual PLMN search in the way that while the search is ongoing, only PLMNs for which at least one cell fulfils the "suitable cell" criteria for normal coverage are displayed to the user. Once the search is completed, the other PLMNs which fulfil only the "suitable cell" criteria for enhanced coverage are displayed in the list, together with an indication of which of the PLMNs fulfils the "suitable cell" criteria for enhanced coverage only.

Solution 4—Coverage Enhancement and Limited Service Capabilities

This solution addresses the issue 4—Coverage Enhancement and limited service capabilities. The following options are examples of possible solutions for issue 4, described as options (i.e., embodiments).

Option 1: When the UE determines that it has stayed in enhanced coverage for a long time period (implementation dependent or standardized or configurable time period, e.g., configurable on the USIM or via OMA MO), then the non-access stratum (NAS) layer triggers a PLMN search procedure for a PLMN on which the UE can camp in normal coverage conditions. For example, this can be done periodically as for the higher priority PLMN selection case. So in the example for issue 4, if during this PLMN search UE_I which supports CE finds a PLMN Y which does not have a higher priority, but which enables the UE to camp in normal coverage conditions (instead of enhanced coverage conditions as for the current PLMN X), the UE_I may select PLMN Y.

Option 2: When the UE determines that the user is requesting a certain service which cannot be provided in enhanced coverage conditions. For example, when the user requests a voice call—especially an emergency call—, then the NAS layer triggers a PLMN search for a PLMN providing normal coverage.

Option 3: dependent on the type of service, option 2 can be combined with option 1. For example, if the user requests an emergency calls, the UE could always trigger a PLMN search for a PLMN providing normal coverage. In another example, in order to become reachable for mobile terminating voice calls, the UE could trigger a PLMN search for a PLMN providing normal coverage, when it has stayed in enhanced coverage for a certain time. In yet another example, for certain data services requiring a higher data rate, the UE could trigger a PLMN search for a PLMN providing normal coverage, when the user requests such a service and additionally the UE has stayed in enhanced coverage for a certain minimum time.

Option 4: do not have a corresponding example in solution 4

Option 5: give the user the ability to select the preferred option, i.e. to stay in CE for long time or to attempt to select a new PLMN according to one of the options 1, 2, or 3. The user can change this option at any time, e.g. when he wants to use a certain application or service requiring high data rates.

Option 6: give the operator the ability to configure the preferred option, 1, 2, 3, or 5, e.g. on the USIM or in an OMA MO.

Legacy specifications may lack explicit instructions regarding how CE should be taken into account for the different PLMN search/selection procedures. This could be interpreted in such a way that CE is considered for each of the procedures, i.e., a PLMN is considered available for PLMN selection, regardless of whether a cell belonging to this PLMN fulfils the "suitable cell" criteria for normal coverage or for enhanced coverage only. (This corresponds to the selection of option 1 for each of the issues 1, 2, and 3 in section 2a.) As a consequence the UE may select a PLMN on which it can camp only in enhanced coverage mode and may not be able to get the kind of service the user wants to use (e.g., voice call), and may stay on this PLMN for a long time.

Furthermore, the UE will not be able to select another PLMN that provides normal coverage conditions and is not a higher priority PLMN.

The current PLMN search/selection procedures can be enhanced to consider the CE feature. For example, the following requirements can apply for automatic PLMN selection:

At switch-on, or following recovery from lack of coverage, the MS selects the registered PLMN or equivalent PLMN (if it is available) using access technologies that the MS is capable of and if necessary attempts to perform a location registration.

An automatic network selection mode procedure can be used. The MS selects and attempts registration on other PLMN/access technology combinations, if available and allowable, in the following order: (i) either the HPLMN (if the EHPLMN list is not present or is empty) or the highest priority EHPLMN that is available (if the EHPLMN list is present); (ii) each PLMN/access technology combination in the user controlled PLMN selector with access technology data file in the subscriber identity module (SIM) (in priority order); (iii) each PLMN/access technology combination in the operator controlled PLMN selector with access technology data file in the SIM (in priority order); (iv) other PLMN/access technology combinations with received high quality signal in random order; and (v) other PLMN/access technology combinations in order of decreasing signal quality.

For the search for a higher priority PLMN the following can apply: In VPLMN, automatic and manual network selection modes can be used. If the MS is in a VPLMN, the MS shall periodically attempt to obtain service on its HPLMN (if the EHPLMN list is not present or is empty) or one of its EHPLMNs (if the EHPLMN list is present) or a higher priority PLMN/access technology combination listed in user controlled PLMN selector or operator controlled PLMN selector by scanning in accordance with the requirements that are applicable to (i), (ii) and (iii) as defined in the automatic network selection mode.

For example, a PLMN can be considered a higher priority PLMN only if it belongs to one of the categories (i), (ii) or (iii) in automatic network selection mode above.

FIG. 1 is a diagram illustrating a method of PLMN searching accounting for CE. The method can be accomplished by systems such as those shown in FIGS. 3, 4 and 6, including the UE 301 and 302 and RAN nodes 311 and 312. In block 106, the UE is off. In block 108, the UE has been turned on and determines if there is a RPLMN saved (such as on a subscriber identity module (SIM)). If not, in block 104, the UE tries to select PLMN/access technology combinations, if available and allowable, in an order specified. In block 114, the UE determines if there is any cell belonging to a selected PLMN and suitable for normal coverage. If so, in block 124, the UE camps on the cell belonging to the selected PLMN in normal coverage mode. If no in block 114, in block 116, the UE determines if there is any cell belonging to the selected PLMN and suitable for CE. If so, in block 122, the UE camps on the cell belonging to the selected PLMN in CE mode. If no in block 116, in block 102, the UE tries to select the next PLMN as specified and returns to block 114.

However, if yes in block 108, e.g. there is a RPLMN saved (such as on a subscriber identity module (SIM)), then in block 110, the UE determines if the cell belongs to RPLMN and is suitable for normal coverage. If yes in block 110, then in block 128, the UE selects RPLMN and camps in normal coverage mode. If no in block 110, then the UE determines if the cell belongs to RPLMN and is suitable for CE. If yes in block 112, then in block 126, the UE selects the RPLMN and camps in CE mode. However, if no in block 112, then the process starting in block 104 is used as described above.

Regarding solution 1—automatic PLMN selection at switch-on or recovery from lack of coverage: in some embodiments, option 1 is used and considers CE in PLMN selection without affecting the PLMN priority. The UE will follow the order of priorities for PLMN selection. For each PLMN the UE will try to camp on a cell in normal coverage mode, or, if no cell belonging to this PLMN is suitable for normal coverage, then the UE will try to camp on any cell belonging to this PLMN and suitable for CE.

With this solution, when the UE is powered on in a very bad coverage area (e.g., underground parking), the UE will be able to camp on a cell and attach with the network if the cell is suitable for CE mode A or CE mode B.

Regarding solution 2—higher priority PLMN selection: in some embodiments, option 2 or 3 is used, i.e., a higher priority PLMN shall not be considered in higher priority PLMN selection, if the higher priority PLMN provides enhanced coverage only (option 2), or if it provides enhanced coverage only and the current PLMN provides normal coverage (option 3). For example, in the example in issue 2, the UE shall not select the higher priority PLMN. The UE is already camping on a cell and registered with another PLMN, so it may be useful to keep the UE registered with the current PLMN until it finds a good cell belonging to a higher priority PLMN. If the bad coverage of the higher priority PLMN is due to a temporary situation, then during the next higher priority PLMN selection attempt the UE may be able to select the higher priority PLMN when a cell has become suitable for normal coverage.

Regarding solution 3—manual PLMN selection: in some embodiments, option 1 is used. For example, CE shall be considered and indicated to the user in manual PLMN selection, i.e., in the example in issue 3, the UE shall provide list of the PLMNs including the PLMN that received a low quality signal, and the UE shall indicate to the user if the PLMN is available for CE camping only. It is up to the user to decide which PLMN to select.

Regarding solution 4—Coverage Enhancement and limited capability: in some embodiments option 5 is used. For example, the UE gives the user the ability to determine the preferred option. This solution can enhance the user's experience.

In some embodiments, for emergency voice calls the UE is allowed to trigger a PLMN search for a PLMN providing normal coverage, if the current RPLMN is only providing enhanced coverage.

Figure 2:
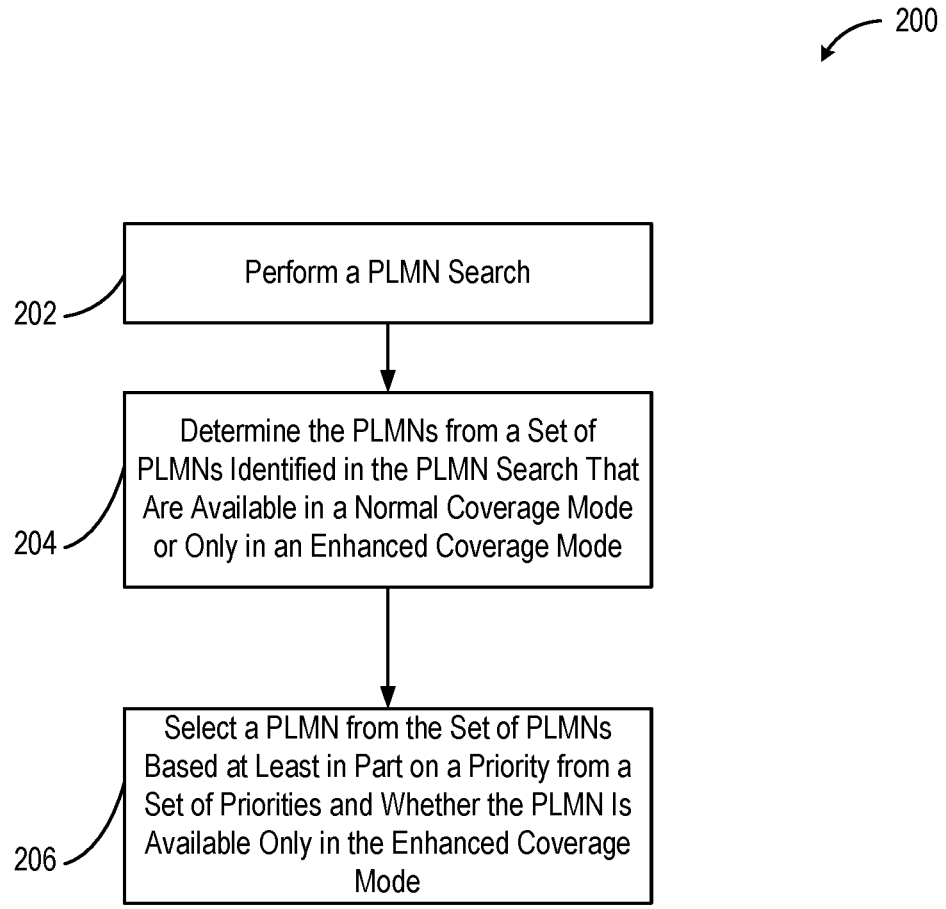
FIG. 2 is a flow chart illustrating a method for selecting a public land mobile network (PLMN) consistent with embodiments disclosed herein.

FIG. 2 is a flow chart illustrating a method for selecting a public land mobile network (PLMN). The method can be accomplished by systems such as those shown in FIGS. 3, 4 and 6, including the UE 301 and 302 and RAN nodes 311 and 312. In block 202, the UE performs a PLMN search. In block 204, the UE determines for each PLMN from a set of PLMNs identified in the PLMN search whether it is available in a normal coverage mode or only in an enhanced coverage mode. In block 206, the UE selects a PLMN from the set of PLMNs based at least in part on a priority from a set of priorities and whether the PLMN is available only in the enhanced coverage mode.

Figure 3:
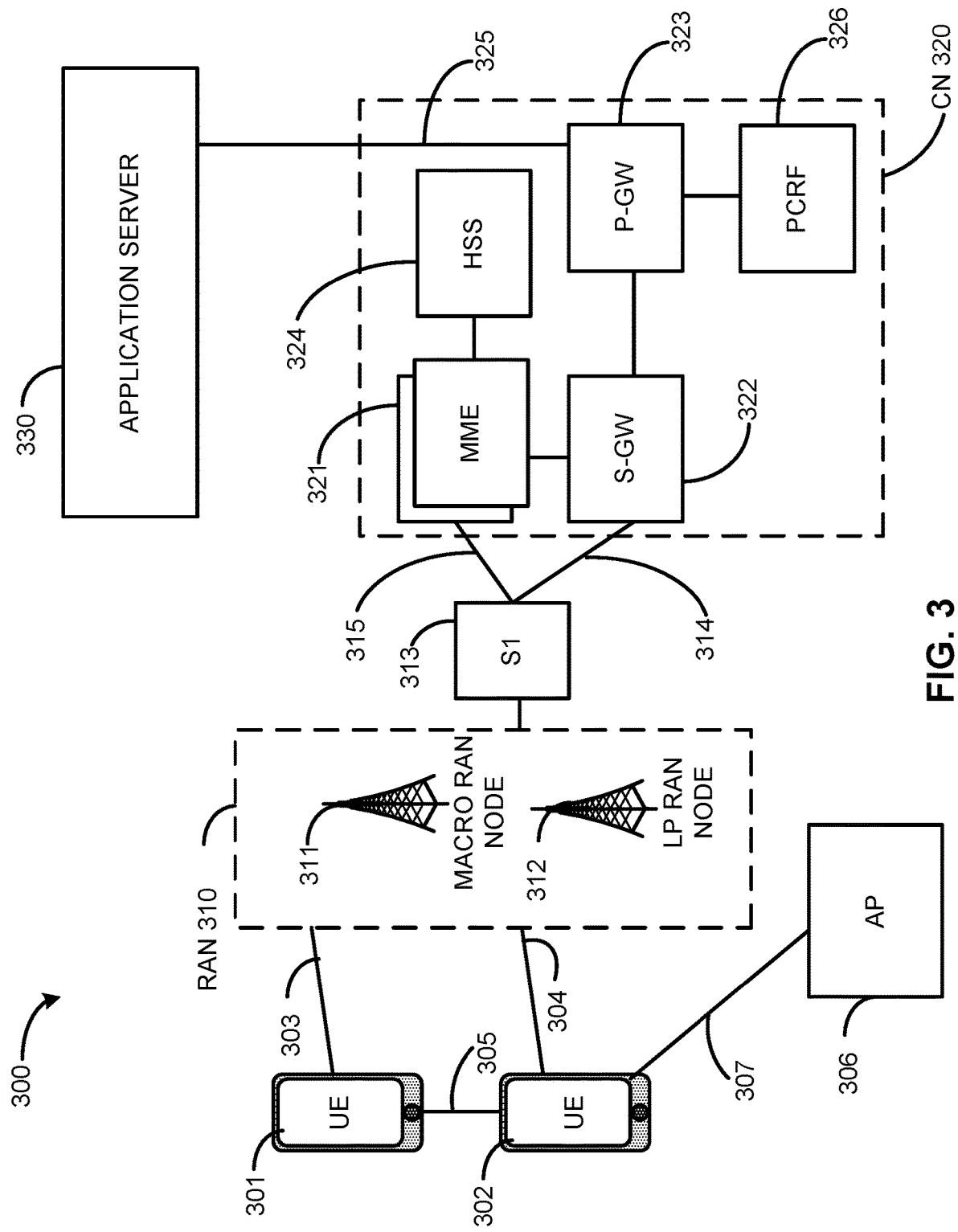
FIG. 3 illustrates an architecture of a system of a network consistent with embodiments disclosed herein.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a PLMN, Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310. The RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 may be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and hybrid automatic repeat request (HARD) information related to the uplink shared channel. Typically, downlink scheduling (assigning control and shared channel resource blocks to the UE 302 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and a serving gateway (S-GW) 322, and an S1-mobility management entity (MME) interface 315, which is a signaling interface between the RAN nodes 311 and 312 and MMEs 321.

In this embodiment, the CN 320 comprises the MMEs 321, the S-GW 322, a Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, the capacity of the equipment, the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the CN 320 (e.g., an EPC network) and external networks such as a network including the application server 330 (alternatively referred to as application function (AF)) via an Internet Protocol (IP) interface 325. Generally, an application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. A Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
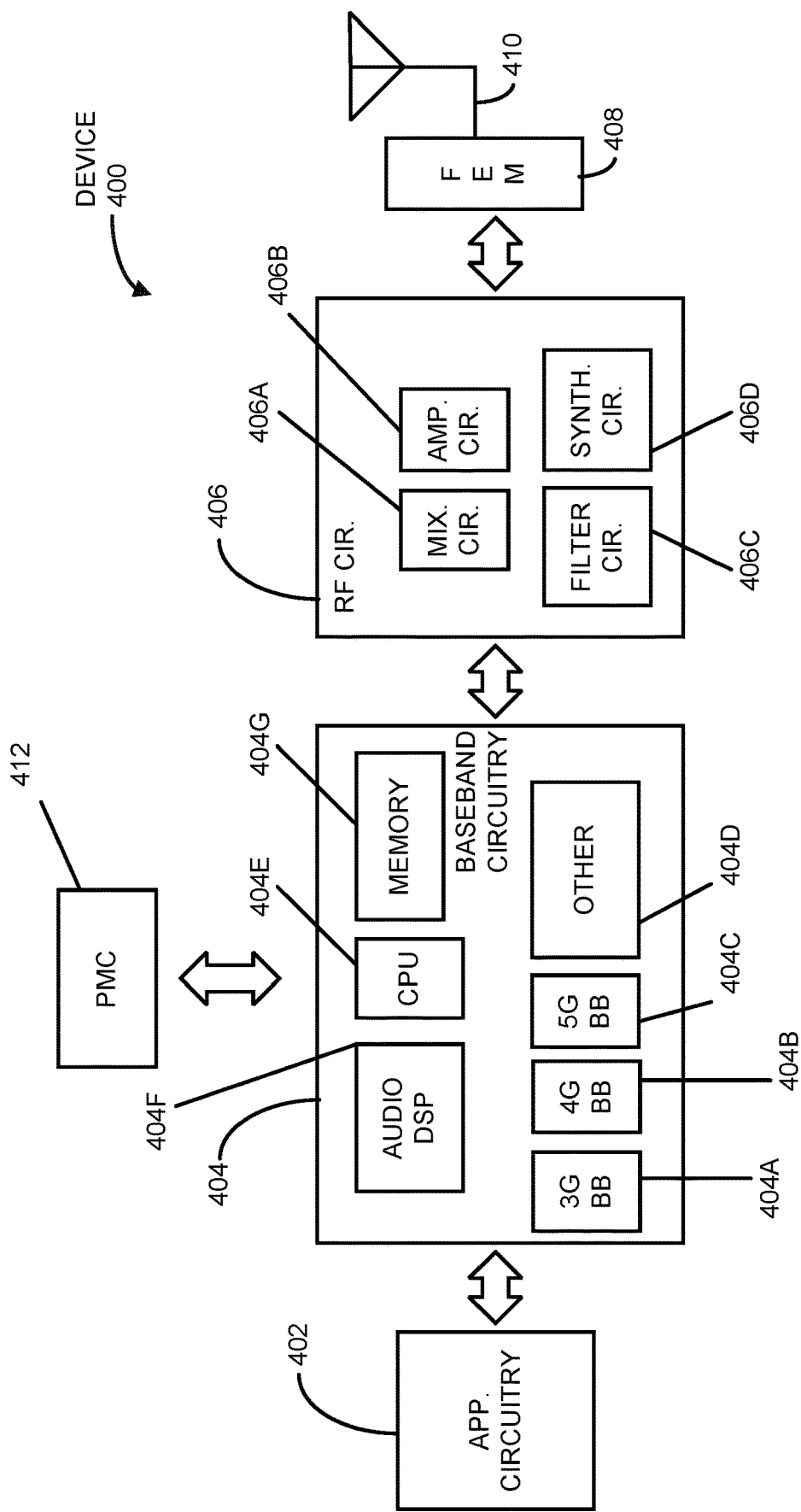
FIG. 4 illustrates example components of a device consistent with embodiments disclosed herein.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (E-UTRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. The RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406A, amplifier circuitry 406B and filter circuitry 406C. In some embodiments, the transmit signal path of the RF circuitry 406 may include filter circuitry 406C and mixer circuitry 406A. RF circuitry 406 may also include synthesizer circuitry 406D for synthesizing a frequency for use by the mixer circuitry 406A of the receive signal path and the transmit signal path. In some embodiments, the mixer circuitry 406A of the receive signal path may be configured to down-convert RF signals received from the FEM circuitry 408 based on the synthesized frequency provided by synthesizer circuitry 406D. The amplifier circuitry 406B may be configured to amplify the down-converted signals and the filter circuitry 406C may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 406A of the receive signal path may comprise passive mixers, although the scope of the embodiments is not limited in this respect.

In some embodiments, the mixer circuitry 406A of the transmit signal path may be configured to up-convert input baseband signals based on the synthesized frequency provided by the synthesizer circuitry 406D to generate RF output signals for the FEM circuitry 408. The baseband signals may be provided by the baseband circuitry 404 and may be filtered by the filter circuitry 406C.

In some embodiments, the mixer circuitry 406A of the receive signal path and the mixer circuitry 406A of the transmit signal path may include two or more mixers and may be arranged for quadrature downconversion and upconversion, respectively. In some embodiments, the mixer circuitry 406A of the receive signal path and the mixer circuitry 406A of the transmit signal path may include two or more mixers and may be arranged for image rejection (e.g., Hartley image rejection). In some embodiments, the mixer circuitry 406A of the receive signal path and the mixer circuitry 406A may be arranged for direct downconversion and direct upconversion, respectively. In some embodiments, the mixer circuitry 406A of the receive signal path and the mixer circuitry 406A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406D may be a fractional-N synthesizer or a fractional N/N+1 synthesizer, although the scope of the embodiments is not limited in this respect as other types of frequency synthesizers may be suitable. For example, synthesizer circuitry 406D may be a delta-sigma synthesizer, a frequency multiplier, or a synthesizer comprising a phase-locked loop with a frequency divider.

The synthesizer circuitry 406D may be configured to synthesize an output frequency for use by the mixer circuitry 406A of the RF circuitry 406 based on a frequency input and a divider control input. In some embodiments, the synthesizer circuitry 406D may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 406D of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 406D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. The FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by the RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device 400 is included in a UE. The PMC 412 may increase the power conversion efficiency while providing desirable implementation size and heat dissipation characteristics.

FIG. 4 shows the PMC 412 coupled only with the baseband circuitry 404. However, in other embodiments, the PMC 412 may be additionally or alternatively coupled with, and perform similar power management operations for, other components such as, but not limited to, the application circuitry 402, the RF circuitry 406, or the FEM circuitry 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
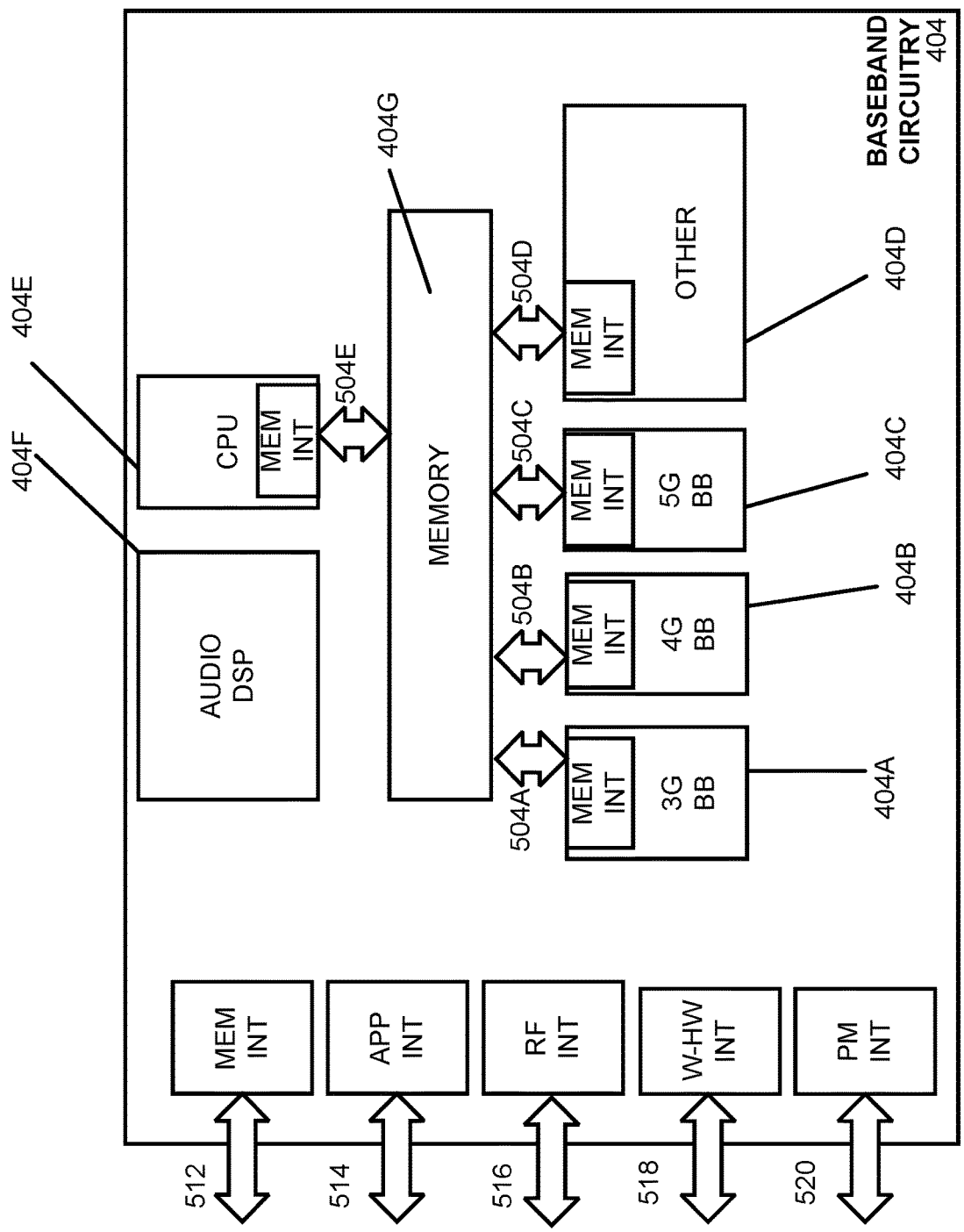
FIG. 5 illustrates example interfaces of baseband circuitry consistent with embodiments disclosed herein.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412).

Figure 6:
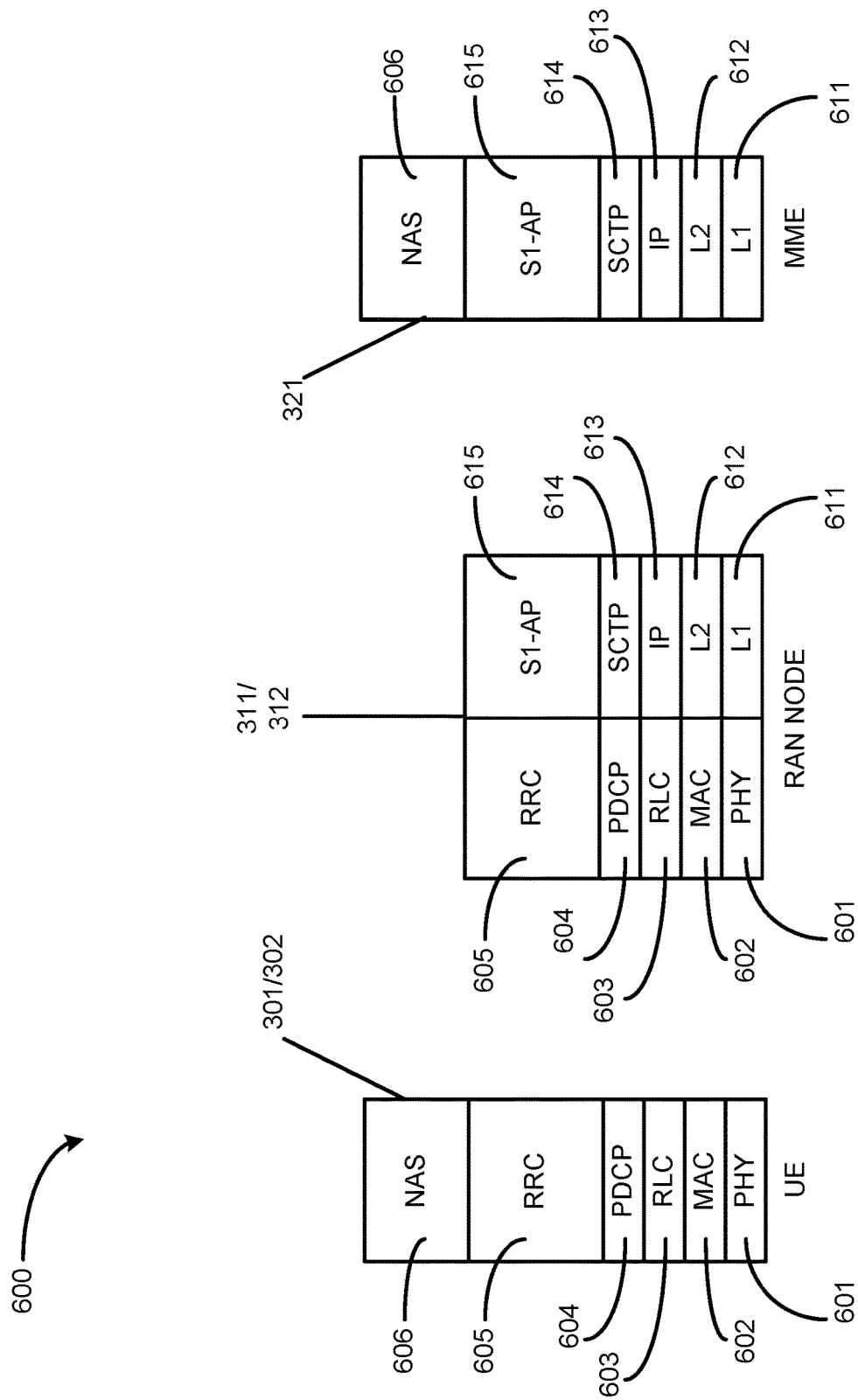
FIG. 6 is an illustration of a control plane protocol stack consistent with embodiments disclosed herein.

FIG. 6 is an illustration of a control plane protocol stack in accordance with some embodiments. In this embodiment, a control plane 600 is shown as a communications protocol stack between the UE 301 (or alternatively, the UE 302), the RAN node 311 (or alternatively, the RAN node 312), and the MME 321.

A PHY layer 601 may transmit or receive information used by the MAC layer 602 over one or more air interfaces. The PHY layer 601 may further perform link adaptation or adaptive modulation and coding (AMC), power control, cell search (e.g., for initial synchronization and handover purposes), and other measurements used by higher layers, such as an RRC layer 605. The PHY layer 601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 603 may operate in a plurality of modes of operation, including: Transparent Mode (TM), Unacknowledged Mode (UM), and Acknowledged Mode (AM). The RLC layer 603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 605 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 301 and the RAN node 311 may utilize a Uu interface (e.g., an LTE-Uu interface) to exchange control plane data via a protocol stack comprising the PHY layer 601, the MAC layer 602, the RLC layer 603, the PDCP layer 604, and the RRC layer 605.

In the embodiment shown, the non-access stratum (NAS) protocols 606 form the highest stratum of the control plane between the UE 301 and the MME 321. The NAS protocols 606 support the mobility of the UE 301 and the session management procedures to establish and maintain IP connectivity between the UE 301 and the P-GW 323.

The S1 Application Protocol (S1-AP) layer 615 may support the functions of the S1 interface and comprise Elementary Procedures (EPs). An EP is a unit of interaction between the RAN node 311 and the CN 320. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 614 may ensure reliable delivery of signaling messages between the RAN node 311 and the MME 321 based, in part, on the IP protocol, supported by an IP layer 613. An L2 layer 612 and an L1 layer 611 may refer to communication links (e.g., wired or wireless) used by the RAN node and the MME to exchange information.

The RAN node 311 and the MME 321 may utilize an S1-MME interface to exchange control plane data via a protocol stack comprising the L1 layer 611, the L2 layer 612, the IP layer 613, the SCTP layer 614, and the S1-AP layer 615.

Figure 7:
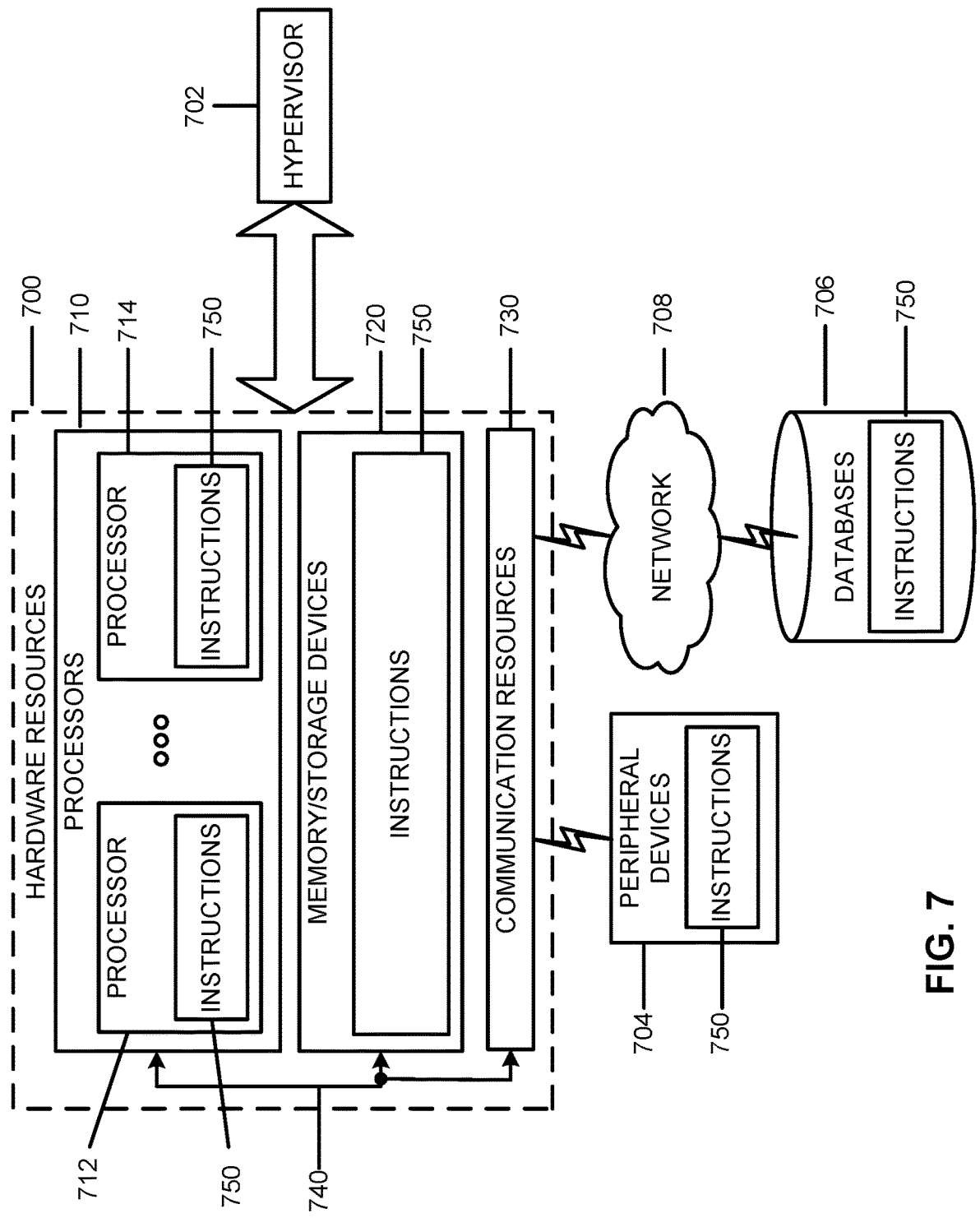
FIG. 7 is a block diagram illustrating components able to read instructions from a machine-readable or computer-readable medium and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Examples

The following examples pertain to further embodiments. Examples that are dependent on another example are intended to be optional. In addition, it should be recognized that multiple optional examples can be combined. For example, Example 1 is a first embodiment that can include the optional components of Example 2 or Example 3 or both Example 2 and 3. The dependent examples are to be viewed as a pool of options that can be combined with the independent example. This is done for clarity, as listing each possible permutation would be lengthy and lose clarity.

Example 1 is an apparatus for a user equipment (UE), comprising: a memory interface and a processor. The memory interface to store and access data corresponding to a set of priorities of public land mobile networks (PLMNs). The processor coupled to memory and configured to support coverage enhancement (CE), the processor configured to: determine to perform a PLMN search or cell selection; decode system information broadcasted by base stations from a set of PLMNs detected during the PLMN search; evaluate a radio quality of each PLMN from the set of PLMNs; determine the PLMNs from the set of PLMNs that are available in normal coverage mode or only in enhanced coverage mode based on a normal radio quality threshold and an enhanced coverage radio quality threshold with an enhanced coverage indicator decoded from a corresponding system information parameter; and select a PLMN from the set of PLMNs based at least in part on a priority from the set of priorities and the enhanced coverage indicator.

Example 2 is the apparatus of Example 1, wherein to determine to perform the PLMN search or cell selection further comprises to determine to perform the PLMN search at switch-on or recovery from lack of coverage.

Example 3 is the apparatus of Example 1, wherein to determine to perform the PLMN search or cell selection further comprises to determine to perform a periodic PLMN search for a higher priority PLMN.

Example 4 is the apparatus of Example 1, wherein to determine to perform the PLMN search or cell selection further comprises to determine to perform a PLMN selection for leaving CE.

Example 5 is the apparatus of Example 4, wherein to determine to perform the PLMN search or cell selection further comprises receiving a request for a service incompatible with CE.

Example 6 is the apparatus of Example 5, wherein the service incompatible with CE is a voice call.

Example 7 is the apparatus of Example 1, wherein the stored set of priorities of PLMNs is stored in the form of an Operator controlled PLMN Selector with Access Technology or a User Controlled PLMN Selector with Access Technology, or a combination of these lists.

Example 8 is the apparatus of Example 1, wherein to select the PLMN from the set of PLMNs further comprises to select the PLMN with a highest priority according to the stored set of priorities of PLMNs and available in a normal coverage mode first, and when no such PLMN exists then select the PLMN with a highest priority according to the stored set of priorities of PLMNs and available in enhanced coverage mode only.

Example 9 is the apparatus of Example 1, wherein to determine to perform the PLMN search or cell selection further comprises to determine to perform the PLMN search at switch-on, recovery from lack of coverage, or periodic PLMN search for a higher priority PLMN, and wherein to select the PLMN from the set of PLMNs further comprises to select the PLMN with a highest priority according to the stored set of priorities of PLMNs regardless of the coverage mode in which the PLMN is available.

Example 10 is the apparatus of Example 9, wherein, if the selected PLMN is available in normal coverage mode and in enhanced coverage mode, the UE attempts connecting to the PLMN and performing registration with the PLMN in a cell where the selected PLMN is available in normal coverage mode.

Example 11 is the apparatus of Example 1, wherein to determine to perform the PLMN search or cell selection further comprises to determine to perform a periodic PLMN search for a higher priority PLMN, PLMN search for exiting CE, or PLMN search upon receiving a request for a service incompatible with CE, and wherein to select the PLMN from the set of PLMNs further comprises to first attempt to select the PLMN with a highest priority according to the stored set of priorities of PLMNs and available in a normal coverage mode, and when no such PLMN exists then stay on the registered PLMN.

Example 12 is the apparatus of any Examples 1-7, wherein to select the PLMN from the set of PLMNs further comprises to select first a PLMN from an equivalent to home PLMN (EHPLMN) list with normal coverage and when no PLMN from the EHPLMN list has normal coverage, select a PLMN from the EHPLMN list with enhanced coverage.

Example 13 is the apparatus of any of Examples 1-7, wherein the processor is a baseband processor.

Example 14 is the apparatus of any of Examples 1-7, wherein the apparatus for the UE forms part of an automotive vehicle.

Example 15 is a user equipment (UE) system for manually selecting a public land mobile network (PLMN) comprising: a cellular communication interface and a processor. The cellular communication interface configured to communicate using one or more radio access technologies (RATs). The processor configured to: determine to perform a PLMN search; decode system information broadcasted by a set of PLMNs; evaluate a radio quality of each PLMN from the set of PLMNs under a normal threshold and an enhanced coverage threshold; determine whether each PLMN from the set of PLMNs is available in a normal coverage mode or only in enhanced coverage mode; and present the set of PLMNs for display including an indicator for each PLMN of whether each PLMN is available in the normal coverage mode or only in the enhanced coverage mode.

Example 16 is the system of Example 15, further comprising receiving a selection of a PLMN from a user and attempting registration with the PLMN.

Example 17 is the system of Example 16, further comprising connecting to the PLMN selected by the user.

Example 18 is the system of Example 15, wherein to present the set of PLMNs for display further comprises to display the PLMNs of the set of PLMNs in an order based at least in part on a priority of each PLMN of the set of PLMNs.

Example 19 is the system of any of Examples 15-18, wherein the processor is a baseband processor.

Example 20 is a method of selecting a public land mobile network (PLMN), the method comprising: performing a PLMN search or cell selection; determining the PLMNs from a set of PLMNs identified in the PLMN search that are available in a normal coverage mode or only in an enhanced coverage mode; and selecting a PLMN from the set of PLMNs based at least in part on a priority from a set of priorities and whether the PLMN is available only in the enhanced coverage mode.

Example 21 is the method of Example 20, wherein performing the PLMN search or cell selection further comprises:

decoding system information broadcasted by the set of PLMNs; and evaluating a radio quality of each PLMN from the set of PLMNs.

Example 22 is the method of Example 21, wherein determining whether each PLMN from the set of PLMNs identified in the PLMN search is available in normal coverage mode or only in the enhanced coverage mode is based on a normal radio quality threshold and an enhanced coverage radio quality threshold.

Example 23 is an apparatus comprising means to perform a method as exemplified in any of Examples 20-22.

Example 24 is a machine readable medium including code, when executed, to cause a machine to perform the method of any one of Examples 20-22.

Example 25 is a computer program product comprising a computer-readable storage medium that stores instructions for execution by a processor to perform operations of a user equipment (UE), the operations, when executed by the processor, to perform a method, the method comprising: performing a PLMN search or cell selection; determining the PLMNs from a set of PLMNs identified in the PLMN search that are available in a normal coverage mode or only in an enhanced coverage mode; and selecting a PLMN from the set of PLMNs based at least in part on a priority from a set of priorities and whether the PLMN is available only in the enhanced coverage mode.

Example 26 is the computer program product of Example 25, wherein the method further comprises: decoding a system information block (SIB) from the set of PLMNs; and evaluating a radio quality of each PLMN from the set of PLMNs.

Example 27 is an apparatus for a user equipment (UE), the apparatus comprising: means for determining to perform a PLMN search; means for performing the PLMN search; means for determining the PLMNs from a set of PLMNs identified in the PLMN search that are available in a normal coverage mode or only in an enhanced coverage mode; means for selecting a PLMN from the set of PLMNs based at least in part on a priority from a set of priorities and whether the PLMN is available only in the enhanced coverage mode.

Example 28 is the apparatus of Example 27, wherein the means for determining whether each PLMN from the set of PLMNs identified in the PLMN search is available in the normal coverage mode or only in the enhanced coverage mode further comprises: means for decoding a system information block (SIB) from the set of PLMNs; and means for evaluating a radio quality of each PLMN from the set of PLMNs.

Additional Examples

Additional Example 1 may include a user equipment (UE) configured to support coverage enhancement (CE).

Additional Example 2 may include the UE of Additional Example 1 or some other example herein, wherein the UE performs public land mobile network (PLMN) selection at switch-on or recovery from lack of coverage and for this PLMN selection the UE considers a PLMN as available also if all the cells belonging to this PLMN are available in enhanced coverage mode only.

Additional Example 3 may include the UE of Additional Example 2 or some other example herein, wherein the priority with which a certain PLMN is selected does not depend on whether the PLMN is available in enhanced coverage mode only or whether the PLMN is also available in normal coverage mode.

Additional Example 4 may include the UE of Additional Example 1 or some other example herein, wherein the UE performs higher priority PLMN selection and for this PLMN selection the UE considers a PLMN as available also if all the cells belonging to this PLMN are available in enhanced coverage mode only.

Additional Example 5 may include the UE of Additional Example 4 or some other example herein, wherein the UE selects the higher priority PLMN only if this PLMN is available in normal coverage mode.

Additional Example 6 may include the UE of Additional Example 4 or some other example herein, wherein the UE selects the higher priority PLMN only if this PLMN is available in at least the same coverage mode or in a better coverage mode as the registered PLMN.

Additional Example 7 may include the UE of Additional Example 1 or some other example herein, wherein the UE performs Manual PLMN selection and for this PLMN selection the UE considers a PLMN as available also if all the cells belonging to this PLMN are available in enhanced coverage mode only.

Additional Example 8 may include the UE of Additional Example 7 or some other example herein, wherein the UE displays the available PLMNs according to an order of priority that depends on the PLMN identity, but does not depend on whether the PLMN is available in enhanced coverage mode only or whether the PLMN is also available in normal coverage mode.

Additional Example 9 may include the UE of Additional Example 7 or some other example herein, wherein for each of the available PLMNs the UE displays whether the PLMN is available in enhanced coverage mode only.

Additional Example 10 may include the UE of Additional Example 1 or some other example herein, wherein after staying in CE for a certain time the UE starts a PLMN selection and selects another PLMN providing normal coverage.

Additional Example 11 may include the UE of Additional Example 1 or some other example herein, wherein when the UE is CE and the user requests to set up a voice call, the UE starts PLMN selection and selects another PLMN providing normal coverage.

Additional Example 12 may include the UE of Additional Example 1 or some other example herein, wherein when the UE is CE and the user requests to set up an emergency voice call, the UE starts PLMN selection and selects another PLMN providing normal coverage.

Additional Example 13 may include an apparatus comprising means to perform one or more elements of a method described in or related to any of Additional Examples 1-12, or any other method or process described herein.

Additional Example 14 may include one or more non-transitory computer-readable media comprising instructions to cause an electronic device, upon execution of the instructions by one or more processors of the electronic device, to perform one or more elements of a method described in or related to any of Additional Examples 1-12, or any other method or process described herein.

Additional Example 15 may include an apparatus comprising logic, modules, or circuitry to perform one or more elements of a method described in or related to any of Additional Examples 1-12, or any other method or process described herein.

Additional Example 16 may include a method, technique, or process as described in or related to any of Additional Examples 1-12, or portions or parts thereof.

Additional Example 17 may include an apparatus comprising: one or more processors and one or more computer readable media comprising instructions that, when executed by the one or more processors, cause the one or more processors to perform the method, techniques, or process as described in or related to any of Additional Examples 1-12, or portions thereof.

Additional Example 18 may include a signal as described in or related to any of Additional Examples 1-12, or portions or parts thereof.

Additional Example 19 may include a signal in a wireless network as shown and described herein.

Additional Example 20 may include a method of communicating in a wireless network as shown and described herein.

Additional Example 21 may include a system for providing wireless communication as shown and described herein.

Additional Example 22 may include a device for providing wireless communication as shown and described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The gNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a user equipment (UE), comprising:
a memory interface to store and access data corresponding to a set of priorities of public land mobile networks (PLMNs);
a processor coupled to memory and configured to support coverage enhancement (CE), the processor configured to:
determine to perform a PLMN search or cell selection;
decode system information broadcasted by base stations from a set of PLMNs detected during the PLMN search;
evaluate a radio quality of each PLMN from the set of PLMNs;
determine the PLMNs from the set of PLMNs that are available in normal coverage mode or only in enhanced coverage mode based on a normal radio quality threshold and an enhanced coverage radio quality threshold with an enhanced coverage indicator decoded from a corresponding system information parameter; and
select a PLMN from the set of PLMNs based at least in part on a priority from the set of priorities and the enhanced coverage indicator.

2. The apparatus of claim 1, wherein to determine to perform the PLMN search or cell selection further comprises to determine to perform the PLMN search at switch-on or recovery from lack of coverage.

3. The apparatus of claim 1, wherein to determine to perform the PLMN search or cell selection further comprises to determine to perform a periodic PLMN search for a higher priority PLMN.

4. The apparatus of claim 1, wherein to determine to perform the PLMN search or cell selection further comprises to determine to perform a PLMN selection for leaving CE.

5. The apparatus of claim 4, wherein to determine to perform the PLMN search or cell selection further comprises receiving a request for a service incompatible with CE.

6. The apparatus of claim 5, wherein the service incompatible with CE is a voice call.

7. The apparatus of claim 1, wherein the stored set of priorities of PLMNs is stored in the form of an Operator controlled PLMN Selector with Access Technology or a User Controlled PLMN Selector with Access Technology, or a combination of these lists.

8. The apparatus of claim 1, wherein to select the PLMN from the set of PLMNs further comprises to select the PLMN with a highest priority according to the stored set of priorities of PLMNs and available in a normal coverage mode first, and when no such PLMN exists then select the PLMN with a highest priority according to the stored set of priorities of PLMNs and available in enhanced coverage mode only.

9. The apparatus of claim 1, wherein to determine to perform the PLMN search or cell selection further comprises to determine to perform the PLMN search at switch-on, recovery from lack of coverage, or periodic PLMN search for a higher priority PLMN, and wherein to select the PLMN from the set of PLMNs further comprises to select the PLMN with a highest priority according to the stored set of priorities of PLMNs regardless of the coverage mode in which the PLMN is available.

10. The apparatus of claim 9, wherein, if the selected PLMN is available in normal coverage mode and in enhanced coverage mode, the UE attempts connecting to the PLMN and performing registration with the PLMN in a cell where the selected PLMN is available in normal coverage mode.

11. The apparatus of claim 1, wherein to determine to perform the PLMN search or cell selection further comprises to determine to perform a periodic PLMN search for a higher priority PLMN, PLMN search for exiting CE, or PLMN search upon receiving a request for a service incompatible with CE, and wherein to select the PLMN from the set of PLMNs further comprises to first attempt to select the PLMN with a highest priority according to the stored set of priorities of PLMNs and available in a normal coverage mode, and when no such PLMN exists then stay on the registered PLMN.

12. The apparatus of claim 1, wherein to select the PLMN from the set of PLMNs further comprises to select first a PLMN from an equivalent to home PLMN (EHPLMN) list with normal coverage and when no PLMN from the EHPLMN list has normal coverage, select a PLMN from the EHPLMN list with enhanced coverage.

13. The apparatus of claim 1, wherein the processor is a baseband processor.

14. The apparatus of claim 1, wherein the apparatus for the UE forms part of an automotive vehicle.

15. A user equipment (UE) system for manually selecting a public land mobile network (PLMN) comprising:
   a cellular communication interface configured to communicate using one or more radio access technologies (RATs);
   a processor configured to:
      determine to perform a PLMN search;
      decode system information broadcasted by a set of PLMNs;
      evaluate a radio quality of each PLMN from the set of PLMNs under a normal threshold and an enhanced coverage threshold;
      determine whether each PLMN from the set of PLMNs is available in a normal coverage mode or only in enhanced coverage mode; and
      present the set of PLMNs for display including an indicator for each PLMN of whether each PLMN is available in the normal coverage mode or only in the enhanced coverage mode.

16. The system of claim 15, further comprising receiving a selection of a PLMN from a user and attempting registration with the PLMN.

17. The system of claim 16, further comprising connecting to the PLMN selected by the user.

18. The system of claim 15, wherein to present the set of PLMNs for display further comprises to display the PLMNs of the set of PLMNs in an order based at least in part on a priority of each PLMN of the set of PLMNs.

19. The system of claim 15, wherein the processor is a baseband processor.

20. A method of selecting a public land mobile network (PLMN), the method comprising:
   performing a PLMN search or cell selection;
   determining the PLMNs from a set of PLMNs identified in the PLMN search that are available in a normal coverage mode or only in an enhanced coverage mode; and
   selecting a PLMN from the set of PLMNs based at least in part on a priority from a set of priorities and whether the PLMN is available only in the enhanced coverage mode.

21. The method of claim 20, wherein performing the PLMN search or cell selection further comprises:
   decoding system information broadcasted by the set of PLMNs; and
   evaluating a radio quality of each PLMN from the set of PLMNs.

22. The method of claim 21, wherein determining whether each PLMN from the set of PLMNs identified in the PLMN search is available in normal coverage mode or only in the enhanced coverage mode is based on a normal radio quality threshold and an enhanced coverage radio quality threshold.

* * * * *